United States Patent [19]

Vogt

[11] Patent Number: 5,441,564
[45] Date of Patent: Aug. 15, 1995

[54] PIGMENT MIXTURE

[75] Inventor: Reiner Vogt, Wixhauser, Germany

[73] Assignee: Merck Patent Gesellschaft mit Beschrankter Haftung, Darmstadt, Germany

[21] Appl. No.: 160,642

[22] Filed: Dec. 2, 1993

[30] Foreign Application Priority Data

Dec. 2, 1992 [DE] Germany .............. 42 40 511.4

[51] Int. Cl.⁶ ............................................ C09D 11/02
[52] U.S. Cl. ................................. 106/417; 106/410; 106/415; 106/418; 106/442; 106/482; 106/493; 106/21 R; 106/22 R; 106/23 R
[58] Field of Search ............... 106/417, 415, 418, 410, 106/442, 482, 493, 21 R, 22 R, 23 R

[56] References Cited

U.S. PATENT DOCUMENTS

| | | | |
|---|---|---|---|
| 4,772,331 | 9/1988 | Noguchi et al. | 106/417 |
| 5,127,952 | 7/1992 | Persello et al. | 106/442 |
| 5,246,492 | 9/1993 | Arima et al. | 106/417 |
| 5,248,332 | 9/1993 | Kamegawa | 106/417 |

FOREIGN PATENT DOCUMENTS

| | | |
|---|---|---|
| 388932 | 9/1990 | European Pat. Off. . |
| 439107 | 7/1991 | European Pat. Off. . |
| 455211 | 11/1991 | European Pat. Off. . |
| 3306400 | 8/1984 | Germany . |

OTHER PUBLICATIONS

English Abstract of EP92/02351 29 Apr. 1993.
Derwent Ascession No. 91-327108 of EP 455,211, 6 Nov. 1991.
Derwent abstract 93-152439/18 (of WO 93/08273), Apr. 29, 1993.

Primary Examiner—Mark L. Bell
Assistant Examiner—Scott L. Hertzog
Attorney, Agent, or Firm—Millen, White, Zelano, & Branigan

[57] ABSTRACT

The invention relates to a pigment mixture containing a component A composed of at least one platelet-shaped interference pigment and a pigment B composed of at least one platelet-shaped color pigment.

8 Claims, No Drawings

PIGMENT MIXTURE

FIELD OF THE INVENTION

The invention relates to mixtures of interference pigments with platelet-shaped colored pigments.

BACKGROUND OF THE INVENTION

Apart from varnishes for uniform colors, effect varnishes are increasingly being used for coatings, in particular for automobiles. Coatings obtained with effect varnishes exhibit differences in degree of brightness and color and differences in brilliance depending on the angle of incidence of the incoming light and the angle of observation. These phenomena are called flop effects. Such an effect with respect to brightness is obtained by using metal platelets, preferably aluminum platelets, and inorganic or organic colored pigments. In general, a two-coat design is used for this type of coating. A base coat containing the color pigment is applied to the substrate which may have been provided with a priming coat. A further coat containing the metal platelets is then applied to the base coat. Finally, this is usually followed by applying a clear coat as an additional coat.

In recent years attempts have been made to replace the metal platelets in these effect varnishes partly or completely by interference pigments, making it possible to obtain different colors depending on the angle of observation.

A pigment mixture containing an organic pigment, a nacreous pigment, aluminum particles and graphite is disclosed in EP-A-0,439,107. The desired effect is achieved by means of a one-coat system. Furthermore, a two-coat system containing a metal-free pigment in the base coat and a mica pigment and an organic pigment in the second coat, the color of the organic pigment being complementary to the color of the mica pigment, is disclosed in EP-A-0,388,932. The color of the pigment in the base coat can either be similar to the color of the organic pigment or similar to the color of the mica pigment.

German Offenlegungsschrift 3,306,400 describes coatings and surface coatings containing a platelet-shaped copper phthalocyanine pigment of the α-modification and a pigment different therefrom or a copper phthalocyanine pigment of different crystal form.

EP-A-0,455,211 describes an effect base coating for the coating of polypropylene substrates, which base coat contains an effect pigment and a color pigment, it being possible for the effect pigment to be a metal pigment or a mica-based interference pigment. The coating is applied to the substrate as a single coat. This coating is said to achieve an excellent flop effect and to make it possible for various brightness and brilliance effects to be matched.

The effect base coating described in EP-A-0,455,211 has the disadvantage that the color pigments used have a geometrical shape which is different from that of the platelet-shaped interference pigments. In general, they are approximately spherical and accordingly their sedimentation is different from that of the platelet-shaped interference pigments. This is reinforced by the different size of the particles. In general, effect pigments have a particle size of 10 to 60 $\mu$m, while organic color pigments have a particle diameter of 0.01 to 0.1 $\mu$m and inorganic color pigments a particle size of 0.2 to 2 $\mu$m. As a result there is a risk that the mixture will separate. Moreover, the spherical color pigments are deposited on the platelet-shaped interference pigments and reduce the gloss of the interference pigment. Furthermore, a substantial expenditure is required for achieving good dispersion of the pigments in the coating system.

OBJECT OF THE INVENTION

An object of the present invention is to provide a pigment mixture which can be readily incorporated in a coating system, and in which separation of the pigments caused by difference in sedimentation behavior is ruled out and the color pigment does not cause a reduction in the luster (gloss) of the interference pigment.

Upon further study of the specification and appended claims, further objects and advantages of this invention will become apparent to those skilled in the art.

SUMMARY OF THE INVENTION

The above object is achieved according to the invention by a pigment mixture containing a component A composed of at least one platelet-shaped interference pigment and a component B composed of at least one platelet-shaped color pigment. On the one hand, platelet-shaped interference pigments are understood to mean pigments based on platelet-shaped base materials, such as, for example, mica, kaolin or talc, which are coated with one or more metal oxide films. On the other hand, they can also be pigments which are produced on a continuous belt in accordance with the International Patent Application PCT/EP 92/02 351 (U.S. Ser. No. 08/211,791).

Platelet-shaped color pigments are understood to mean pigments described in the International Patent Application PCT/EP 92/02 351 (U.S. Ser. No. 08/211,791). Furthermore, platelet-shaped color pigments include composite pigments produced by applying a color pigment to a platelet-shaped base material in accordance with EP-A-0,220,617 and in accordance with German Patent Application P4,211,560.

The invention furthermore relates to varnishes, printing inks, plastics or coatings pigmented with the pigment according to the invention.

DETAILED DESCRIPTION OF THE INVENTION

Preferred platelet-shaped interference pigments for the pigment mixture according to the invention are mica flakes coated with metal oxides such as are disclosed, for example, in U.S. Pat. No. 3,087,828 and U.S. Pat. No. 3,087,829. The metal oxides used are either highly refractive colorless metal oxides, such as, in particular, titanium oxide and/or zirconium dioxide, or colored metal oxides, such as, for example, chromium oxide, nickel oxide, copper oxide, cobalt oxide and, in particular, iron oxides, such as, for example, $Fe_2O_3$ or $Fe_3O_4$ or mixtures of such metal oxides. Metal oxide/mica pigments of this type are commercially available under the trade names AFFLAIR ® and IRIODIN ® (product of E. Merck, Darmstadt).

Furthermore, the interference pigments described in the International Patent Application PCT/EP 92/02 351 are also suitable for the pigment mix according to the invention in component A. They consist of a transparent, inorganic, platelet-shaped matrix, preferably silica, which contains a soluble or insoluble colorant. An example of an insoluble colorant is an organic or inorganic pigment, while the soluble colorant is a soluble metal compound which gives rise to a coloring metal oxide or a soluble organic dye, for example. The inorganic matrix is covered on at least one-side with one or more thin, transparent or semi-transparent reflecting metal oxide or metal films. Details can be seen from the above mentioned international application.

Pigments which are suitable for the pigment mixture according to the invention in component B include platelet-shaped color pigments, which are also described in the international application PCT/EP 92/02 351 (U.S. Ser. No. 08/211,791). They differ from the interference pigments described there in that they consist only of an inorganic matrix containing a colorant. These color pigments are likewise produced on a continuous belt. For example, the pigment may consist of an inorganic matrix, e.g., $SiO_2$, which contains a soluble coloring agent or an insoluble coloring pigment. For the insoluble coloring pigment, a dispersion of a precursor of the matrix, e.g., sodium silicate, and the pigment is applied as a thin film on the continuous belt. The solidified film obtained after drying is treated with an acid, washed and then separated from the belt. For the soluble coloring agent, e.g., dye or coloring metal oxide, a solution of a precursor and the agent or soluble metal compound which gives rise to the agent is applied to the continuous belt. Herein, the coloring agent or pigment is located in the matrix. Further details can be seen from the international application.

Furthermore, pigments which can be used in component B include platelet-shaped composite pigments obtained by applying a color pigment to a platelet-shaped base material by means of a binder, for example, a high molecular weight compound, in accordance with EP-A-0,220,617 or by spray-drying a suspension base material and pigment particles in accordance with German Patent Application DE-P-4,211,560. In these cases, the pigment coloring agent is located on the surface of the substrate base material.

The pigment mixture according to the invention is prepared by mixing components A and B in accordance with known processes, it being possible for component A to consist of one or more platelet-shaped interference pigments and for component B to consist of one or more platelet-shaped color pigments. The mixing ratio of the two components depends on the desired effect and forms part of the knowledge of one skilled in the art. For example, the mixing ratio of components A and B depends on the coloring (tinctorial) strength of component B, which depends on the concentration of the dye in the pigment. The mixing ratio may be, for example, 1:9 to 9:1, preferably 3:7 to 7:3, based on weight.

The pigment mixture according to the invention can be used for pigmenting varnishes, printing inks, plastic systems or coatings, for example. The concentration of the pigment mixture in the system to be pigmented, for example in a varnish, is between 1 and 80% by weight, preferably more than 2% by weight, relative to the total solids content of the system. It depends on the practical application involved.

The pigment mixture according to the invention has the advantage that the desired color flop effect can be achieved by the application of a single coat. This color effect flop is very pronounced. Compared with coatings containing an interference pigment and a customary color pigment, coatings obtained with the pigment mixture according to the invention show a distinct depth effect and a glitter effect.

The pigment mixture can be incorporated in the coating system by simple addition with stirring. The complicated step of milling and dispersing the pigments is no longer necessary.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German application No. P 42 40 511.4, filed Dec. 2, 1992, is hereby incorporated by reference.

EXAMPLES

Table 1 shows the coloristic data of coatings obtained with the pigment mixtures according to the invention and the pigment mixtures of the prior art.

The colorimetric measurements were carried out using a HUNTER-LAB measuring instrument and resulted in LAB values for the following measuring geometries: 22.5°/22.5° (gloss) and 90°/0° (mass tone). The gloss was calculated by the following formula:

$$[L_{G1} - L_{mass\ tone})/L_{G1}] * 100,$$

where $L_{G1}$ is LAB gloss value and $L_{mass\ tone}$ is the LAB mass tone value.

TABLE 1

|  | $L_{gloss}$ | $L_{mass\ tone}$ | Gloss |
| --- | --- | --- | --- |
| Example 1: | 56.5 | 30.5 | 46.0 |
| Comparative Example 1: | 54.3 | 38.2 | 29.7 |
| Example 2: | 64.6 | 42.4 | 34.4 |
| Comparative Example 2: | 63.4 | 54.1 | 14.7 |

The applications of Examples 1 and 2 using the pigment mixtures according to the invention show better gloss than Comparative Examples 1 and 2. Moreover, a distinct "depth effect" and a "glitter effect" are noticeable.

The colorimetric measurements of the coatings compared in Table 2 were carried out using a ZEISS-L*A*B* measuring instrument and resulted in LAB values for the following measuring geometries: 70°/95° (gloss) and 90°/45° (mass tone). The relative gloss (relative difference in brightness) was calculated by the following formula:

$$[L_{G1} - L_{mass\ tone})/L_{G1}] * 100,$$

in a conventionally known manner.

TABLE 2

|  | L* | A* | B* | L* | A* | B* |  |
| --- | --- | --- | --- | --- | --- | --- | --- |
|  | (Gloss) | | | (Mass tone) | | | rel. gloss |
| Example 3: | 84.2 | 5.9 | −45.6 | 31.5 | 9.8 | 9.8 | 62.6 |
| Comparative Ex. 3: | 79.0 | 6.9 | 43.0 | 32.2 | 14.4 | 14.3 | 59.2 |
| Example 4: | 61.2 | −7.0 | −36.4 | 24.4 | 12.5 | −6.0 | 60.1 |
| Comparative Ex. 4: | 53.0 | −6.5 | −34.6 | 22.1 | 10.7 | −5.8 | 58.3 |
| Example 5: | 83.1 | −6.1 | 38.1 | 26.1 | 1.4 | 1.6 | 68.6 |

TABLE 2-continued

|  | L* | A* (Gloss) | B* | L* | A* (Mass tone) | B* | rel. gloss |
| --- | --- | --- | --- | --- | --- | --- | --- |
| Comparative Ex. 5: | 78.7 | −10.2 | 31.5 | 29.1 | −3.9 | −2.4 | 63.0 |

The applications of Example 3 to 5, described below, using the pigment mixtures according to the invention show better gloss than Comparative Examples 3 to 5 described below. A distinct "depth effect" and a "glitter effect" are noticeable. Moreover, a pronounced color flop is noticeable.

The examples given below are intended to illustrate the invention without limiting it.

Example 1

0.45 g of $SiO_2$ platelets (prepared in accordance with the international application PCT/EP 92/02351 U.S. Ser. No. 08/211,791) pigmented with $TiO_2$ (R-D: BAYER) is incorporated together with 0.45 g of IRIODIN ® 153 (Merck), metal oxide/mica pigment, in 53.7 g of NC varnish (Merck) by means of a motor-driven stirrer at 400 rpm over a period of 5 minutes. This gives a pigment mixture which, after application to a black base, was measured by colorimetry.

Example 2

0.9 g of $SiO_2$ platelets (prepared in accordance with the international application PCT/EP 92/02351 U.S. Ser. No. 08/211,791) pigmented with $TiO_2$ (R-D: BAYER) is incorporated together with 0.9 g of IRIODIN ® 163 (Merck) in 53.7 g of NC varnish (Merck) by means of a motor-driven stirrer at 400 rpm over a period of 5 minutes. This gives a pigment mixture which, after application to a black base, was measured by colorimetry.

Comparative Example 1

9 g of $TiO_2$ (R-D BAYER) were dispersed in 91 g of varnish by means of a pearl mill at 3500 rpm for 1 hour. This gave a 9% strength paste. 1 g of this paste was incorporated with 0.45 g of IRIODIN ® 153 (Merck) in 52.8 g of varnish by means of a motor-driven stirrer at 400 rpm 20 over a period of 5 minutes. The pigment/varnish system obtained was applied to a black base and then measured by colorimetry.

Comparative Example 2

18 g of $TiO_2$ (R-D BAYER) were dispersed in 82 g of varnish by means of a pearl mill at 3500 rpm for 1 hour. This gave a 18% strength paste. 1 g of this paste was incorporated with 0.9 g of IRIODIN ® 163 (Merck) in 52.8 g of varnish by means of a motor-driven stirrer at 400 rpm over a period of 5 minutes. The pigment/varnish system obtained was applied to a black base and then measured by colorimetry.

Example 3

0.45 g of $SiO_2$ platelets (prepared in accordance with the international application PCT/EP 92/02351 U.S. Ser. No. 08/211,791) pigmented with DPP Red (Ciba-Geigy) are incorporated together with 0.45 g of IRIODIN ® 205 (Merck) in 53.7 g of NC varnish (Merck) by means of a motor-driven stirrer at 400 rpm over a period of 5 minutes. This gives a pigment mixture which, after application to a black base, exhibits a distinct color flop effect from interference gold to mass tone red.

Example 4

0.45 g of $SiO_2$ platelets (prepared in accordance with the international application PCT/EP 92/02351) pigmented with DPP Red (Ciba-Geigy) are incorporated together with 0.45 g of IRIODIN ® 225 (Merck) in 53.7 g of NC varnish (Merck) by means of a motor-driven stirrer at 400 rpm over a period of 5 minutes. This gives a pigment mixture which, after application to a black base, exhibits a distinct color flop effect from interference blue to mass tone red.

Example 5

0.45 g of $SiO_2$ platelets (prepared in accordance with the international application PCT/EP 92/02351 U.S. Ser. No. 08/211,791) pigmented with Berlin Blue are incorporated together with 0.45 g of IRIODIN ® 205 (Merck) in 53.7 g of NC varnish (Merck) by means of a motor-driven stirrer at 400 rpm over a period of 5 minutes. This gives a pigment mixture which, after application to a black base, exhibits a distinct color flop effect from interference gold to mass tone blue.

Comparative Example 3

4.5 g of DPP Red (Ciba-Geigy) were dispersed in 95.5 g of varnish by means of pearl mill at 3500 rpm for 1 hour. 1 g of the 4.5% paste obtained were incorporated with 0.45 g of IRIODIN ®205 (Merck) in 52.7 g of varnish by means of a motor-driven stirrer at 400 rpm over a period of 5 minutes. This gives a pigment mixture which, after application to a black base, shows a distinct color flop effect from interference gold to mass tone red.

Comparative Example 4

4.5 g of DPP Red (Ciba-Geigy) were dispersed in 95.5 g of varnish by means of pearl mill at 3500 rpm for 1 hour. 1 g of the 4.5% paste obtained were incorporated with 0.45 g of IRIODIN ® 225 (Merck) in 52.7 g of varnish by means of a motor-driven stirrer at 400 rpm over a period of 5 minutes. This gives a pigment mixture which, after application to a black base, shows a distinct color flop effect from interference blue to mass tone red.

Comparative Example 5

9 g of Berlin Blue were dispersed in 91 g of varnish by means of pearl mill at 3500 rpm for 1 hour. 1 g of the 9% paste obtained were incorporated with 0.45 g of IRIODIN ® 205 (Merck) in 52.8 g of varnish by means of a motor-driven stirrer at 400 rpm over a period of 5 minutes. This gives a pigment mixture which, after application to a black base, shows a distinct color flop effect from interference gold to mass tone blue.

We claim:

1. A pigment mixture containing a component A comprising at least one platelet-shaped interference pigment and a component B comprising at least one platelet-shaped color pigment consisting of a transparent, inorganic matrix containing a soluble or insoluble colorant.

2. The pigment mixture of claim 1, wherein the soluble colorant is a soluble metal compound which gives rise to a coloring metal oxide or a soluble organic dye.

3. The pigment mixture of claim 1, wherein the insoluble colorant is an inorganic pigment.

4. The pigment mixture of claim 1, characterized in that the platelet-shaped color pigment is a platelet-shaped base material with particles of a color pigment applied thereto.

5. A varnish, printing ink, plastic system or coating pigmented with the pigment mixture of claim 1.

6. The pigment mixture of claim 1, wherein the insoluble colorant is an organic pigment.

7. The pigment mixture of claim 1, wherein the transparent, inorganic matrix is silica.

8. The pigment mixture of claim 1, wherein component A and component B are present in a ratio of 1:9 to 9:1 by weight.

* * * * *